(12) United States Patent
Keane

(10) Patent No.: US 9,592,991 B1
(45) Date of Patent: Mar. 14, 2017

(54) CABLE REEL SYSTEM

(71) Applicant: Joseph Keane, Oconomowoc, WI (US)

(72) Inventor: Joseph Keane, Oconomowoc, WI (US)

( * ) Notice: Subject to any disclaimer, the term of this patent is extended or adjusted under 35 U.S.C. 154(b) by 0 days.

(21) Appl. No.: 14/995,651

(22) Filed: Jan. 14, 2016

Related U.S. Application Data

(60) Provisional application No. 62/103,829, filed on Jan. 15, 2015.

(51) Int. Cl.
*B65H 75/20* (2006.01)
*B65H 75/28* (2006.01)
*B65H 75/14* (2006.01)

(52) U.S. Cl.
CPC ............. *B65H 75/28* (2013.01); *B65H 75/14* (2013.01)

(58) Field of Classification Search
CPC ...... B65H 75/28; B65H 75/285; B65H 75/14; B65H 75/141; B65H 75/143
USPC ..................................... 191/12 R, 12.2 R, 14
See application file for complete search history.

(56) References Cited

U.S. PATENT DOCUMENTS

| | | | |
|---|---|---|---|
| 4,083,621 A | 4/1978 | Davidson et al. | |
| 4,201,278 A | 5/1980 | Balde | |
| 4,880,182 A | 11/1989 | Gelfman | |
| 7,044,278 B2 | 5/2006 | Cleveland | |
| 7,072,200 B2 | 7/2006 | Lanni | |
| 7,193,873 B2 | 3/2007 | Lanni | |
| 7,984,798 B1* | 7/2011 | Hall | H02G 11/02 191/12 R |
| 8,474,742 B2 | 7/2013 | Smrha | |
| 8,876,560 B2 | 11/2014 | Thompson et al. | |
| 2005/0072645 A1 | 4/2005 | Kovacki et al. | |
| 2005/0236243 A1 | 10/2005 | Huang | |
| 2006/0186255 A1 | 8/2006 | Rooker | |
| 2010/0224718 A1* | 9/2010 | Strong | B65H 75/14 242/608.5 |
| 2011/0024544 A1* | 2/2011 | Smrha | B65H 75/14 242/396.1 |
| 2011/0240791 A1* | 10/2011 | Lindley | B65H 75/14 242/609 |
| 2013/0075522 A1* | 3/2013 | Penumatcha | B65H 75/14 242/614 |
| 2013/0161430 A1* | 6/2013 | Weissbrod | B21C 47/323 242/118.4 |
| 2013/0171865 A1* | 7/2013 | Ceraldi | H01R 13/72 439/501 |
| 2013/0284844 A1* | 10/2013 | Holmberg | B65H 75/38 242/407 |
| 2014/0346264 A1* | 11/2014 | Yokoyama | B65H 75/28 242/118 |
| 2015/0008274 A1* | 1/2015 | Mizuno | H02G 11/02 242/404 |
| 2015/0014464 A1 | 1/2015 | Dohara et al. | |

OTHER PUBLICATIONS http://www.robreels.com/ (available before Jan. 15, 2015).

(Continued)

*Primary Examiner* — Jason C Smith
(74) *Attorney, Agent, or Firm* — Joseph T. Miotke; DeWitt Ross & Stevens SC

(57) ABSTRACT

A cable reel assembly system in which a teach pendant cable can be removably installed. An insert is positioned in alignment with an aperture in a central spool cylinder, and an adapter is mounted to the insert. A teach pendant cable can be removably connected to the adapter.

12 Claims, 5 Drawing Sheets

(56) References Cited

OTHER PUBLICATIONS http://reautomated.com/services_robotics.cfm (available before Jan. 15, 2015).
Photograph of R&A reel (available before Jan. 15, 2015).

* cited by examiner

CABLE REEL SYSTEM

CROSS-REFERENCES TO RELATED APPLICATIONS

This application claims the benefit of prior-filed, U.S. Provisional Patent Application No. 62/103,829, filed on Jan. 15, 2015, the entire contents of which are incorporated herein by reference.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

BACKGROUND OF THE INVENTION

The present invention relates to cable reel systems and more specifically to cable reel systems for use in connection with teach pendants in manufacturing and other industrial settings.

BRIEF SUMMARY OF THE INVENTION

Teach pendants, also referred to as teach boxes, are typically handheld devices that are used to program the motion of robotic devices. Teach pendants are typically interfaced with a control box using a teach pendant cable. Teach pendant cables vary in length and can typically range from 15 feet to 60 feet (or longer) in length. A teach pendant cable reel is typically mounted on or near the control box. When a user desires to program a robot, the user will typically pick up the teach pendant and unreel the teach pendant cable as the user walks over to the robot to be programmed.

Teach pendant cables can become damaged from a variety of causes. In conventional teach pendant cable reel systems, all or portions of the cable reel assembly typically must be disassembled to replace the damaged teach pendant cable. In some instances, the entire teach pendant cable system must be sent back to the manufacturer to replace a damaged teach pendant cable. These circumstances result in increased cost and increased downtime. A continuing need exists for a teach pendant cable reel system in which a damaged teach pendant cable reel can be replaced without the need to disassemble the entire cable reel unit or sending the entire cable reel unit back to the manufacturer.

DETAILED DESCRIPTION OF THE INVENTION

Figure 1:
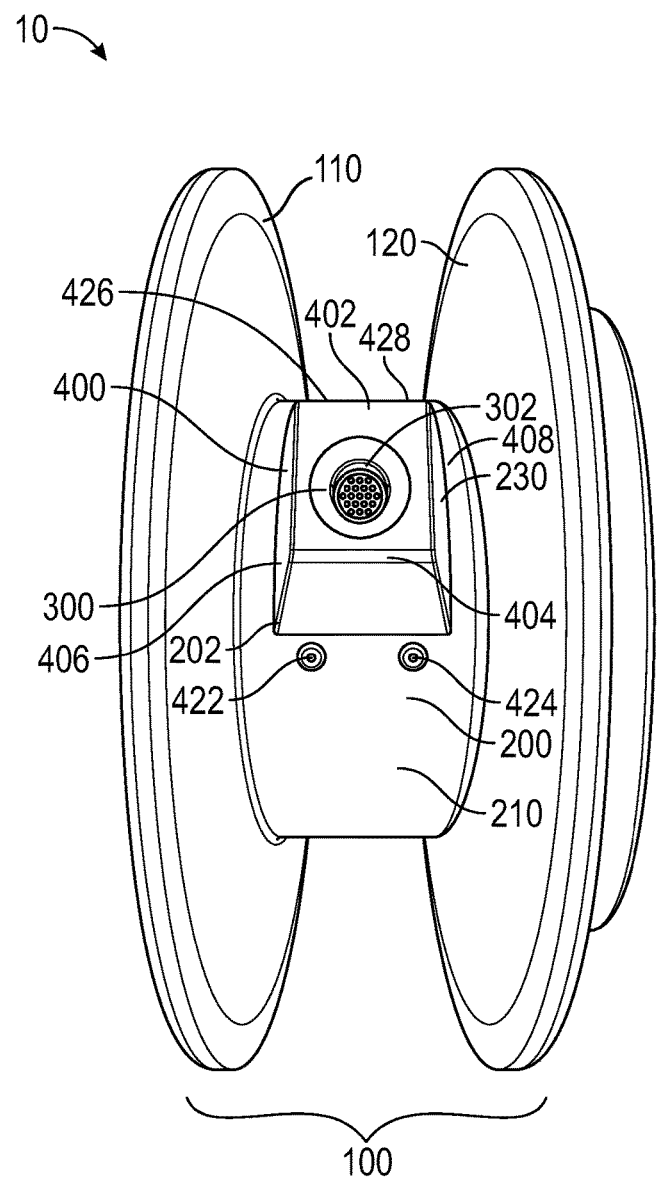
FIG. 1 is a front view of the cable reel assembly according to one aspect of the invention.
Figure 2:
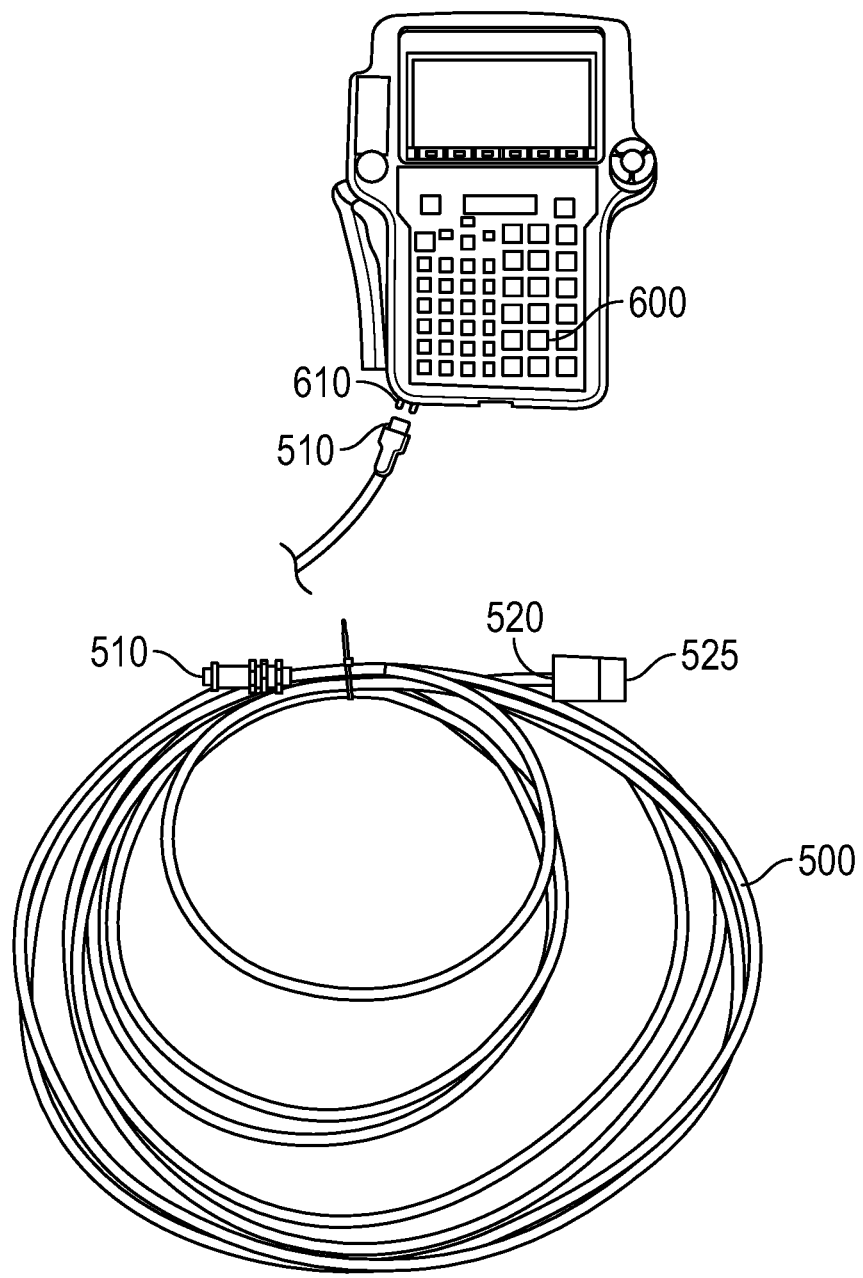
FIG. 2 is a view of a teach pendant and teach pendant cable according to one aspect of the invention.

Referring to FIG. 1, a front view of cable reel unit 10 is shown. Cable reel unit 10 typically includes a spool assembly 100 having a first spool sidewall 110 and a second spool sidewall 120 and a central spool cylinder 200. A cable 500 (shown in FIG. 2), such as a teach pendant cable, is typically wrapped around central spool 200 and retained in place by sidewalls 110 and 120. Referring to FIG. 2, a first end 510 of cable 500 attaches to a teach pendant 600, typically at teach pendant coupling 610. A second end 520 of cable 500 is electrically connected to a control box (not shown). A connector 525 proximate end 520 typically is connected to the spool assembly 100 at adapter 300, shown in FIG. 1. Adapter 300 is typically mounted in central spool cylinder 200 to permit cable 500 to interface with spool assembly 100. Adapter 300 typically is a mating connector, but can likewise be any other component for electrically coupling cable 500 with spool assembly 100. Adapter 300 can be selected from a variety of configurations to accommodate the wiring and pin configuration of a desired teach pendant cable 500.

Referring back to FIG. 1, adapter 300 is typically interfaced with central spool cylinder 200 via insert 400. As shown in FIG. 1, insert 400 typically includes a first surface 402, second surface 404, and side surfaces 406 and 408. Insert 400 is typically positioned to be in alignment with an aperture 202 in central spool assembly 200. Adapter 300 is typically inserted through an aperture (not shown) in the first surface 402 of insert 400 and held in place with a threaded collar 302. Other suitable structures to affix adapter 300 to insert 400 can likewise be used.

Figure 3:
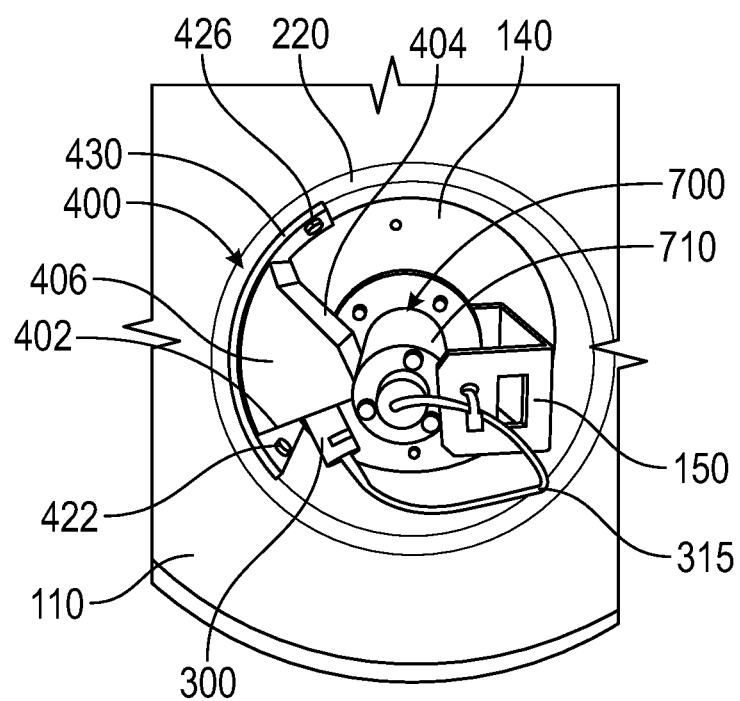
FIG. 3 is a side view of the cable reel assembly according to one aspect of the invention.

Referring now to FIG. 3, a side view of insert 400 is shown as it is typically installed proximate the inner surface 220 of central spool cylinder 200. As shown in FIGS. 1 and 3, insert 400 is typically affixed to the inner surface 220 of central spool cylinder 200 using fasteners 422, 424, 426, and 428, which are inserted through apertures in insert flange 430 and apertures in central spool 200. Fasteners 422, 424, 426, and 428 are typically screws, but any other suitable fastener can likewise be used to affix insert 400 to cylinder 200. As shown in FIG. 3, insert flange 430 is typically configured with a curvature that generally matches the curvature of the inner surface 220 of spool assembly 200, thereby permitting flange surface 430 to interface with the inner surface 220 of spool cylinder 200.

Still referring to FIG. 3, insert 400 is typically shaped and positioned to minimize the stress at the interface of adapter 300 and cable 500, thereby reducing the likelihood of damage to the electrical connection between the cable 500 and adapter 300. The first surface 402 of insert 400 typically extends in a direction generally perpendicular to the inner surface 220 of spool cylinder 200 at the general location where these surfaces meet. This orientation typically reduces the amount of stress exerted on adapter 300 because it orients the interface of adapter 300 and cable 500 to be generally aligned with the central axis of cable 500 at this interface location as cable 500 is reeled and unreeled. This stress is typically reduced by causing the forces exerted by cable 500 as it is reeled and unreeled to be orthogonal to the surface of adapter 300 (i.e., primarily along the longitudinal axis of cable 500 at the location where it interfaces with adapter 300). This orthogonal force is typically bore by the threaded interface connecting adapter 300 to cable 500 at connector 525, and the lateral force that might cause damage to the electrical connection is typically minimized.

Still referring to FIG. 3, the first insert surface 402 typically has a length less than the radial distance between the inner surface 220 of spool cylinder 200 and the outer surface 710 of slip ring assembly 700. This configuration typically enables surface 402 to extend in a generally perpendicular direction to the surface of central cylinder 200 at the general location where surface 402 meets with the inner surface 220 of central cylinder 200. The second insert surface 404 typically has a sloped shape that provides a guide path for cable 500 as it passes from the outer surface 210 of central cylinder 200 and through aperture 230 in cylinder 200.

Referring to FIG. 3, spool assembly 100 (see FIG. 1) is shown facing the outer surface of spool sidewall 110. A support arm 150 is interconnected with the inner hub 140 of spool assembly 100 and extends outward as shown. Support arm 150 can also be interconnected at other suitable locations within spool assembly 100. A slip ring assembly 700 is likewise interconnected with spool assembly 100. Slip ring assembly 700 typically rotates with the spool assembly 100 and maintains an electrical connection between teach pendant 600 and a cable (not shown), such as a pigtail cable, that interconnects with a control panel (not shown). A cable 315 is typically interconnected with slip ring assembly 700 and typically terminates at adapter 300. Cable 315 is typically supported by support arm 150. Adapter 300 can be removably interconnected, or mated, with connector 525, which is interconnected with teach pendant cable 500.

Figure 4:
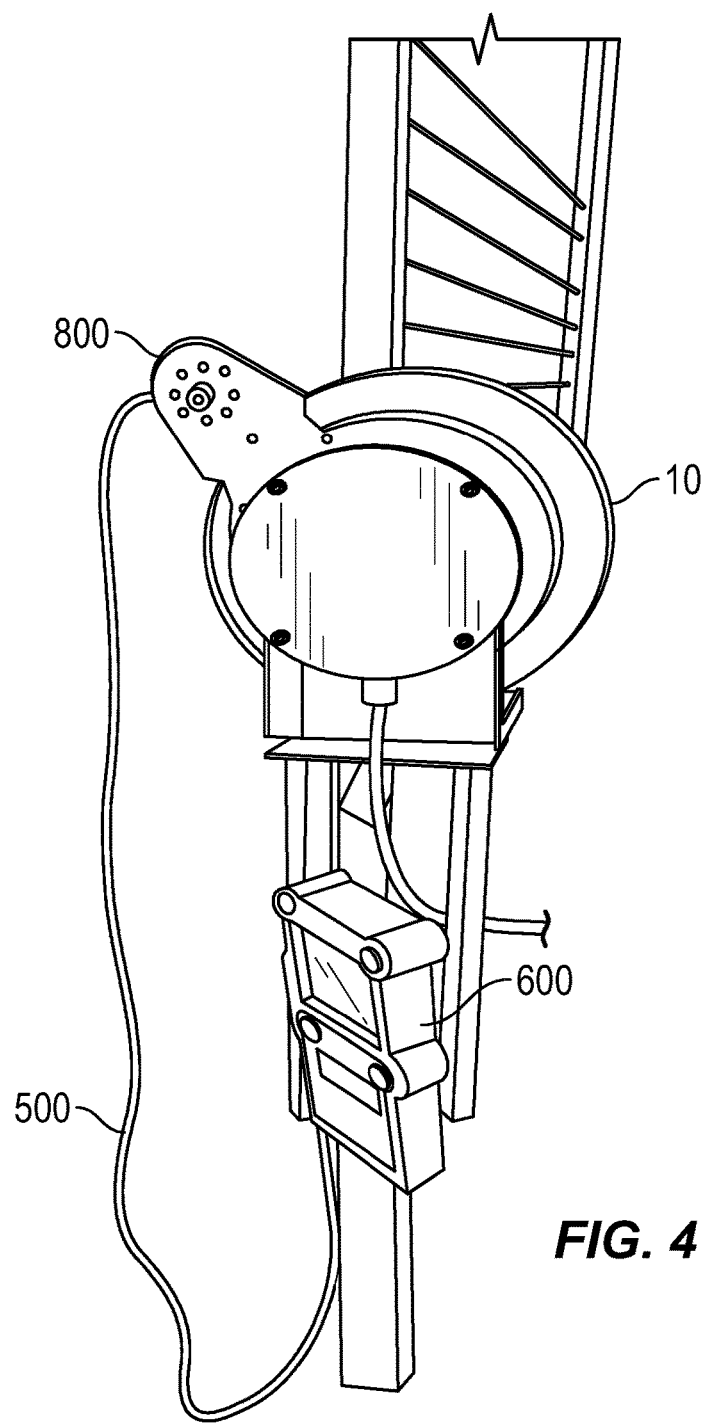
FIG. 4 is a view of an installation of the cable reel assembly according to one aspect of the invention.
Figure 5:
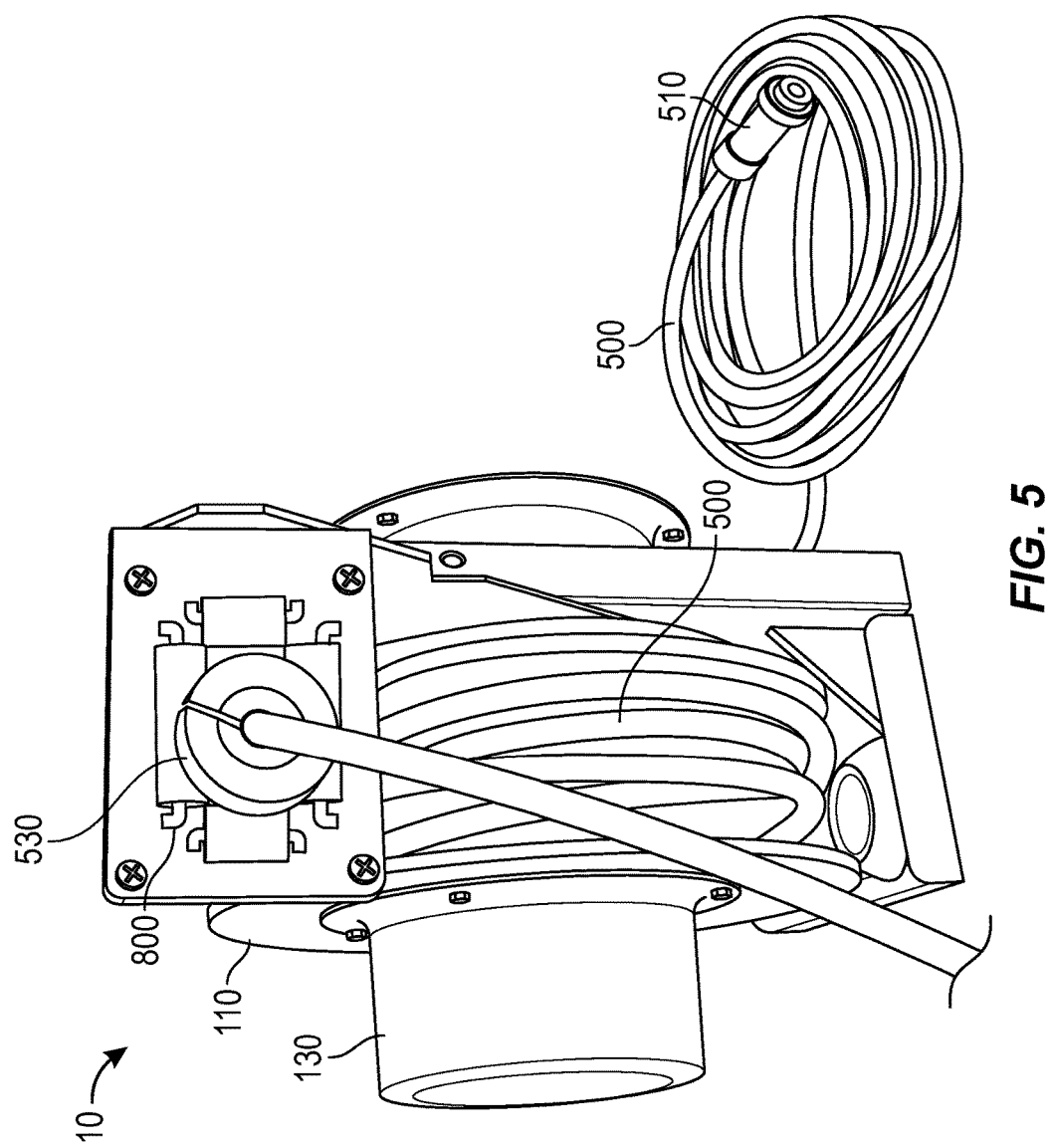
FIG. 5 is another view the cable reel assembly according to another aspect of the invention.

Referring to FIGS. 4 and 5, following is an illustrative, nonlimiting example of usage of the present invention. Step 1: Securely mount the reel assembly 10 in its desired position using bolts such as ⅜" (M10) bolts. The spool centerline should be aligned with the cable guide 800 as shown in FIG. 5. Step 2: Position the cable guide 800. The guide 800 should be oriented so that the cable 500 comes off the reel 10 in a straight line without bends. It should be noted that the reel 10 is typically pre-tensioned if the cable stop 530 and teach pendant cable 500 were factory installed on the cable reel 10. Step 3: Adjust the cable stop 530 to the desired position. Step 4: Connect the reel pigtail connector (not shown) to the controller (not shown). Step 5: Connect the teach pendant cable connector 525 to the teach pendant 600 and re-spool the teach pendant cable 500 to a desired length by re-engaging the ratchet lock (not shown). Turn on power to the teach pendant 600 and check all electrical signals.

Spring Tension Procedure

The tension on reel 10 can be adjusted by adding wraps of cable 500 (increasing tension) or removing wraps of cable 500 (decreasing tension). Step 1: Pull about 10 feet of cable 500 from reel 10, allowing spool 100 to rotate. Step 2: Test reel 10 operation for desired effect. Re-adjust as desired using the foregoing procedures.

Cable Removal Procedure

The following procedure can be used to remove a worn or damaged teach pendant cable 500 from the reel 10 prior to installation of a new teach pendant cable 500. Step 1: Turn off all electrical power. Step 2: Disconnect the cable 500 from the teach pendant 600. Step 3: Remove the cable stop 530 and allow the teach pendant cable 500 to retract on to the spool 100. Ensure all tension is off the spring (not shown) by manually rotating the spool 100 (normally clockwise when viewed from the junction box side). Step 4: Remove the cable 500 from the spool 100 by looping the cable 500 over the spool sidewall 110 and large slip ring cover 130. Step 5: Disconnect the teach pendant cable connector 525 from the adapter, or mating connector, 300 mounted in the center of the spool cylinder 200. If a wire tie was used, carefully snip and remove the wire tie.

Cable Installation

Step 1: Unspool the new cable 500 and, if feasible, lay it out to eliminate any twists. This step typically assists in the winding operation of the reel 10 and prolongs cable 500 life. Step 2: Take the teach pendant connector 525 side of the teach pendant cable 500 and slide it through the cable guide 800. Continue this process until all the teach pendant cable is through the cable gland, or cable stop, 530 and guide 800 except for approximately the last foot of cable 500. Step 3: Plug the teach pendant cable connector 525 into the mating connector, or adapter, 300 that is mounted in the center of the spool 100. Make sure that the cable connector 525 is aligned properly and threaded correctly on to the spool's connector, or adapter, 300. If necessary a wrench may be used to tighten the cable connector 300, but this should be done with caution to avoid over-tightening. As an extra precaution, gently wrap a wire tie around the last foot of the teach pendant cable 500 to the end of the cable 500 to keep the connector 300 from being pulled and damaged. The wire tie should not be over-tightened. Step 4: Wind the teach pendant cable 500 back on the reel spool 100 by hand rotating the spool 100 in direction it turns free of spring tension (normally clockwise when viewed from the junction box side.). Step 5: Install and adjust the cable stop 530 to the desired position. Step 6: Turn on power to the teach pendant 600 and check all electrical signals. Step 7: Pre-tension the reel 100 and complete the installation.

All patents, patent publications, and peer-reviewed publications (i.e., "references") cited herein are expressly incorporated by reference to the same extent as if each individual reference were specifically and individually indicated as being incorporated by reference. In case of conflict between the present disclosure and the incorporated references, the present disclosure controls.

It is understood that the invention is not confined to the particular construction and arrangement of parts herein illustrated and described, but embraces such modified forms thereof as come within the scope of the claims.

What is claimed is:

1. A cable reel assembly, comprising:
a first spool sidewall,
a second spool sidewall, and
a central spool cylinder disposed between the first spool sidewall and the second spool sidewall;
an aperture in the central spool cylinder disposed at a point along an outer surface of the cylinder;
an insert disposed inside the spool cylinder and positioned in general alignment with the aperture,
the insert comprising
a first surface extending in a generally radial direction from an inner surface of the spool cylinder,
a second surface extending in a generally radial direction from the inner surface of the spool cylinder and interfaced with the first surface at an edge distal to the inner surface of the spool cylinder,
a first insert sidewall disposed on a first outer side of the first surface and second surface and extending in a direction generally parallel to the first spool sidewall and second spool sidewall, and
a second insert sidewall disposed on a second outer side of the first surface and second surface and extending in a direction generally parallel to the first spool sidewall and second spool sidewall; and
an adapter disposed in an aperture in the first surface of the insert, wherein the adapter is electrically connected to a slip ring disposed proximate the central spool cylinder.

2. The assembly of claim 1, wherein the first surface of the insert extends in a direction generally perpendicular to the inner surface of the central spool cylinder at a location where the first surface of the insert is proximate the inner surface of the central cylinder spool.

3. The assembly of claim 1, wherein the central axis of the adapter is perpendicular to the first surface of the insert.

4. The assembly of claim 1, wherein the first surface of the insert interfaces with the second surface of the insert at approximately a right angle.

5. The assembly of claim 1, further comprising an arm structure proximate the central spool assembly and extending in direction generally parallel to the central axis of the central spool assembly, wherein a wire electrically connecting the adapter to the slip ring is affixed to the arm structure.

6. The assembly of claim 1, wherein a teach pendant cable is interfaced with the adapter.

7. The assembly of claim 1, wherein a threaded connector mates the insert with the adapter.

8. The assembly of claim 7, wherein the adapter is removably affixed to the insert.

9. The assembly of claim 1, wherein the slip ring is electrically connected with a control cabinet.

10. The assembly of claim 1, wherein the first surface of the insert is generally planar.

11. The assembly of claim 1, wherein the second surface of the insert is a sloped shape.

12. The assembly of claim 1, wherein the adapter is a threaded coupling.

* * * * *